US012601451B2

(12) United States Patent
Park

(10) Patent No.: US 12,601,451 B2
(45) Date of Patent: Apr. 14, 2026

(54) CRYOGENIC LIQUID STORAGE TANK INCLUDING SUPPORTER STRUCTURE

(71) Applicant: JUNGWOO ENE Co., Ltd., Busan (KR)

(72) Inventor: Junhyung Park, Busan (KR)

(73) Assignee: JUNGWOO ENE Co., Ltd., Busan (KR)

( * ) Notice: Subject to any disclaimer, the term of this patent is extended or adjusted under 35 U.S.C. 154(b) by 0 days.

(21) Appl. No.: 18/946,802

(22) Filed: Nov. 13, 2024

(65) Prior Publication Data

US 2025/0297708 A1 Sep. 25, 2025

(30) Foreign Application Priority Data

Mar. 19, 2024 (KR) ........................ 10-2024-0037992

(51) Int. Cl.
*F17C 13/00* (2006.01)
*F17C 1/08* (2006.01)

(52) U.S. Cl.
CPC .............. *F17C 13/001* (2013.01); *F17C 1/08* (2013.01); *F17C 2201/0109* (2013.01); *F17C 2203/0304* (2013.01); *F17C 2203/0391* (2013.01); *F17C 2203/0629* (2013.01); *F17C 2223/0161* (2013.01)

(58) Field of Classification Search
CPC .. F17C 13/001; F17C 1/08; F17C 2201/0109; F17C 2203/0304; F17C 2203/0391; F17C 2203/0629
See application file for complete search history.

(56) References Cited

U.S. PATENT DOCUMENTS 3,132,762 A * 5/1964 Gabarro .................... F17C 3/08 220/560.05
3,425,585 A * 2/1969 Nichols ................. F17C 13/083 220/560.12
5,651,473 A * 7/1997 Preston ................. F17C 13/001 220/592.27
9,702,505 B2 * 7/2017 Ames ........................ F17C 3/08

FOREIGN PATENT DOCUMENTS

CN 113063089 A 7/2021
KR 10-2011-0058973 A 6/2011
KR 10-1933058 B1 12/2018
KR 10-2022-0094473 A 7/2022
KR 10-2023-0143655 A 10/2023
KR 10-2623433 B1 1/2024

* cited by examiner

*Primary Examiner* — Don M Anderson
*Assistant Examiner* — Jennifer Castriotta
(74) *Attorney, Agent, or Firm* — Park, Kim & Suh, LLC

(57) ABSTRACT

A cryogenic liquid storage tank includes an inner tank, an outer tank, a supporter, and a Multi-Layer Insulation (MLI). The inner tank stores cryogenic liquid and includes hemispherical-form inner side plates at opposite ends thereof and an insertion groove extending inside the inner tank at a center of one of the inner side plates. The outer tank covers an exterior of the inner tank and includes hemispherical-form outer side plates formed at opposite ends thereof. The supporter is fixed to the outer tank and is inserted into the insertion groove to support the inner tank. The MLI is disposed in a contact area of the insertion groove and the supporter to minimize a thermal access and to enhance a heat insulation property.

14 Claims, 12 Drawing Sheets

CRYOGENIC LIQUID STORAGE TANK INCLUDING SUPPORTER STRUCTURE

CROSS-REFERENCE TO RELATED PATENT APPLICATION

This application claims the benefit of Korean Patent Application No. 10-2024-0037992, filed on Mar. 19, 2024, in the Korean Intellectual Property Office, the disclosure of which is incorporated herein in its entirety by reference.

BACKGROUND OF THE INVENTION

1. Field of the Invention

The present invention relates to a cryogenic liquid storage tank including a supporter structure, particularly, to a cryogenic liquid storage tank including a supporter structure that may minimize thermal access so as to maximize a heat insulation property, and more particularly, to a cryogenic liquid storage tank including a supporter structure in which supporters are used to stably support an inner tank, to uniformly maintain a space between an inner tank and an outer tank, to function as a buffer, to reduce a contact area with an inner tank to minimize thermal access, and thereby, to improve a vacuum insulation performance.

2. Description of the Related Art

In general, liquified natural gas may be stored in a storage tank at a temperature of below −162° C. under nonhigh pressure, whereas liquid hydrogen needs lower temperature and more pressure than those of liquified natural gas. Accordingly, there is a demand for more strict solution in storing compared with an existing storage technique for liquified natural gas.

That is, liquid hydrogen has a low boiling point property as its liquefaction temperature is −253° C. which is lower than that of cryogenic liquified natural gas. In this regard, liquid hydrogen evaporates more easily and rapidly than liquified natural gas and Boil-Off Rate (BOR) of liquid hydrogen is 10 times greater than that of liquified natural gas.

Meanwhile, a device for storing liquid hydrogen includes a globular-form outer tank, a globular-form inner tank included in the outer tank for storing liquid hydrogen, and supporters for supporting a space between the inner tank and the outer tank.

However, an existing device for storing liquid hydrogen has a poor function in controlling a movement such as vertical mobility, horizontal mobility, and rotation of an inner tank. Also, when an inner tank moves, the device does not have a function of returning the inner tank to its original place and thereby, structural stability may not be secured. Moreover, heat may be penetrated from an outer tank to an inner tank through a plurality of supporters interposed between the inner tank and the outer tank and thus, a heat insulation property may be lowered.

Accordingly, there is a demand for the development of a technology that may minimize thermal access through supporters and the flow of cryogenic liquid in an inner tank.

SUMMARY OF THE INVENTION

The present invention provides a cryogenic liquid storage tank including a supporter structure in which supporters are used to stably support an inner tank, to uniformly maintain a space between an inner tank and an outer tank, to function as a buffer, to reduce a contact area with an inner tank to minimize thermal access, and thereby, to improve a vacuum insulation performance.

According to an aspect of the present invention, there is provided a cryogenic liquid storage tank including a supporter structure including: an inner tank for storing cryogenic liquid which includes hemispherical-form inner side plates formed at both sides thereof and an insertion groove entered into the inside at center of the inner side plates; an outer tank which is formed to cover the outside of the inner tank and includes hemispherical-form outer side plates formed at both sides thereof; a supporter which is inserted into the insertion groove at the center of the inside of the outer side plates and supports the inner tank; and a Multi-Layer Insulation (MLI) disposed in a contact area of the insertion groove and the supporter.

Here, the supporter may include a vacuum hole penetrated at one side thereof to form a vacuum between the inner tank and the outer tank.

Here, the supporter may include a vacuum port at the outside thereof to be connected to the vacuum hole and a vacuum pump is connected to the vacuum port.

Also, the supporter may be supported by a bracket formed in the inside of the outer tank.

Also, the outer tank may include a reinforcement pin at the inner circumferential surface thereof to suppress generation of buckling.

Also, a supporting unit may be combined between the outside surface of the insertion groove and the inner circumferential surface of the inner tank.

Also, the supporter may have a cross-section of a square waveform or a side-lying ㄹ-letter form and the MLI may be formed in a contact area of the insertion groove and the supporter in correspondence to the form of the supporter.

Also, the supporter may include a whirlwind-form grooves extended in a longitudinal direction on the outer circumferential surface thereof and the MLI may be formed in a contact area of the insertion groove and the supporter in correspondence to the form of the supporter.

Also, the supporter may have a front end in the form of a closed pipe, the cross-section of the supporter may have an uneven structure, and the MLI may be formed in a contact area of the insertion groove and the supporter in correspondence to the form of the uneven structure of the supporter.

Also, the end part of the MLI may be fixed by using a flange-type bush.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
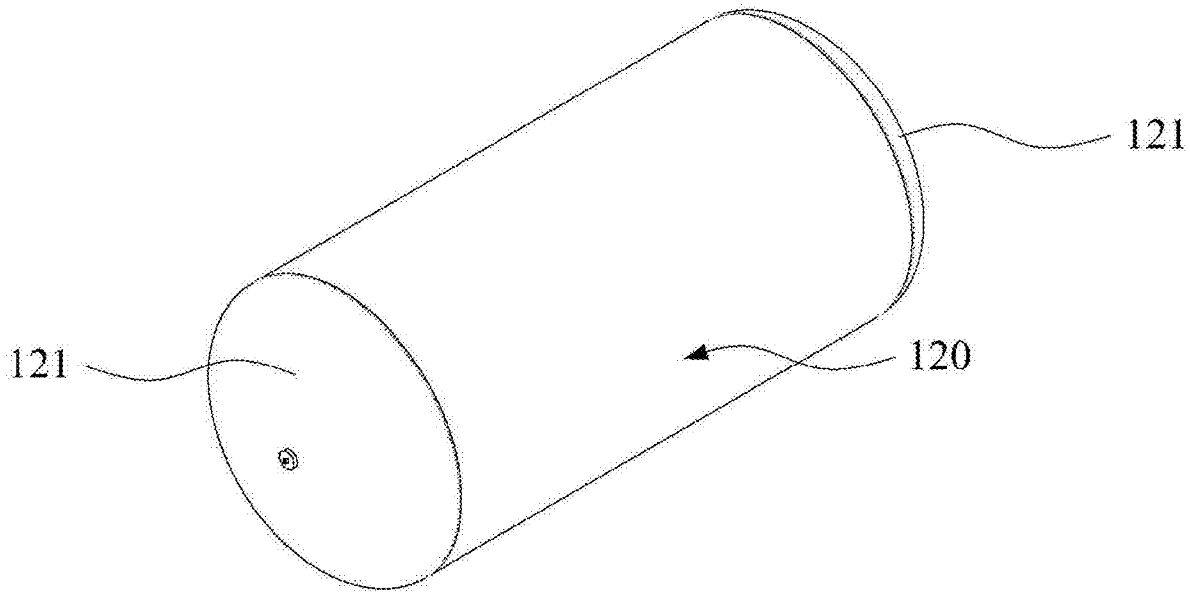
FIGS. 1A and 1B illustrate a cryogenic liquid storage tank including a supporter structure according to an embodiment of the present invention.
Figure 1B:
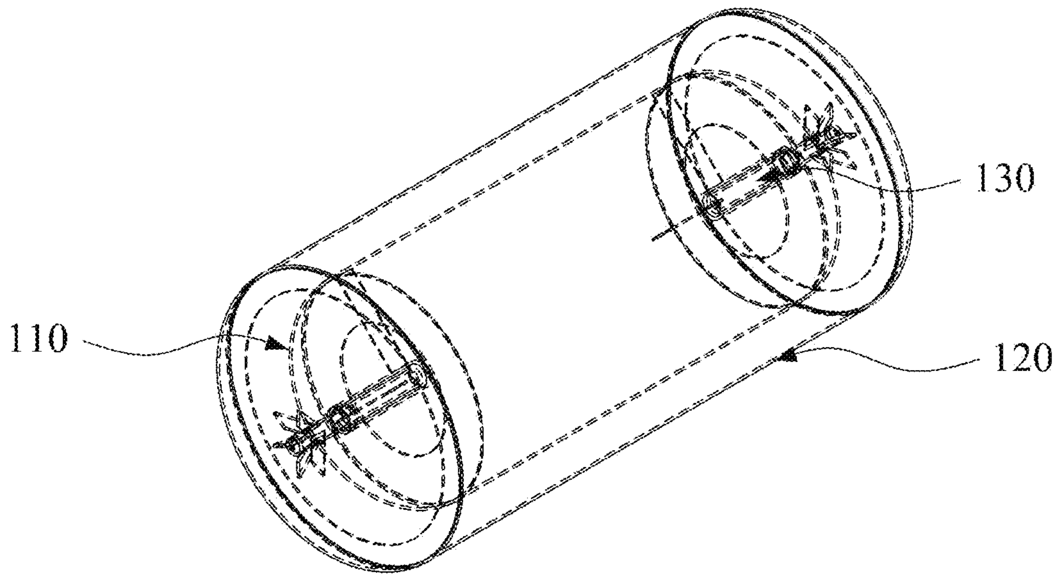
Figure 2:
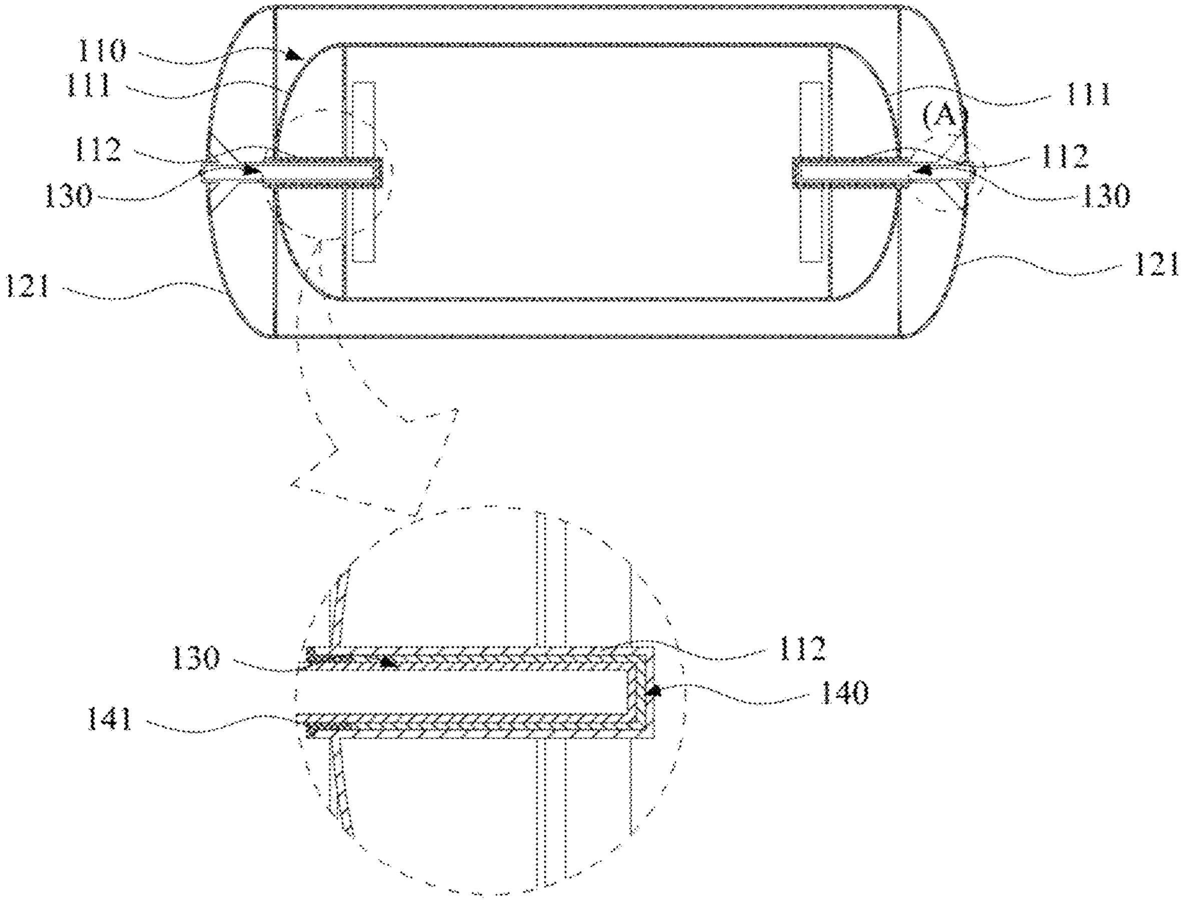
FIGS. 2 and 3 are cross-sectional views respectively illustrating the cryogenic liquid storage tank including a supporter structure of FIGS. 1A and 1B.

Hereinafter, embodiments of the present invention will be described in more detail with reference to the accompanying drawings.

A cryogenic liquid storage tank including a supporter structure according to an embodiment of the present invention includes an inner tank 110 for storing cryogenic liquid, an outer tank 120, a supporter 130, and a Multi-Layer Insulation (MLI) 140, wherein the inner tank 110 includes hemispherical-form inner side plates 111 formed at both sides thereof and an insertion groove 112 entered into the inside at center of the inner side plates 111, the outer tank 120 is formed to cover the outside of the inner tank 110 and includes hemispherical-form outer side plates 121 formed at both sides thereof, the supporter 130 is inserted into the insertion groove 112 at the center of the inside of the outer side plates 121 and supports the inner tank 110, and the MLI 140 is included in a contact area of the insertion groove 112 and the supporter 130. Accordingly, thermal access may be minimized and a heat insulation property may be maximized.

Hereinafter, the cryogenic liquid storage tank including a supporter structure will be described in more detail with reference to FIGS. 1A through 9.

First, referring to FIGS. 1A through 4, the inner tank 110 is formed in a cylindrical form for storing cryogenic liquid such as liquid hydrogen, liquefied helium, liquified natural gas, liquefied nitrogen, and liquefied oxygen and is closed with the hemispherical-form inner side plates 111 at both sides thereof so that the inner tank 110 may be pressurized to, for example, 20 bar or above. Also, the insertion groove 112 having a specific form entered into the inside at center of the inner side plates 111 is formed for the supporter 130 is inserted and fixed.

Figure 3:
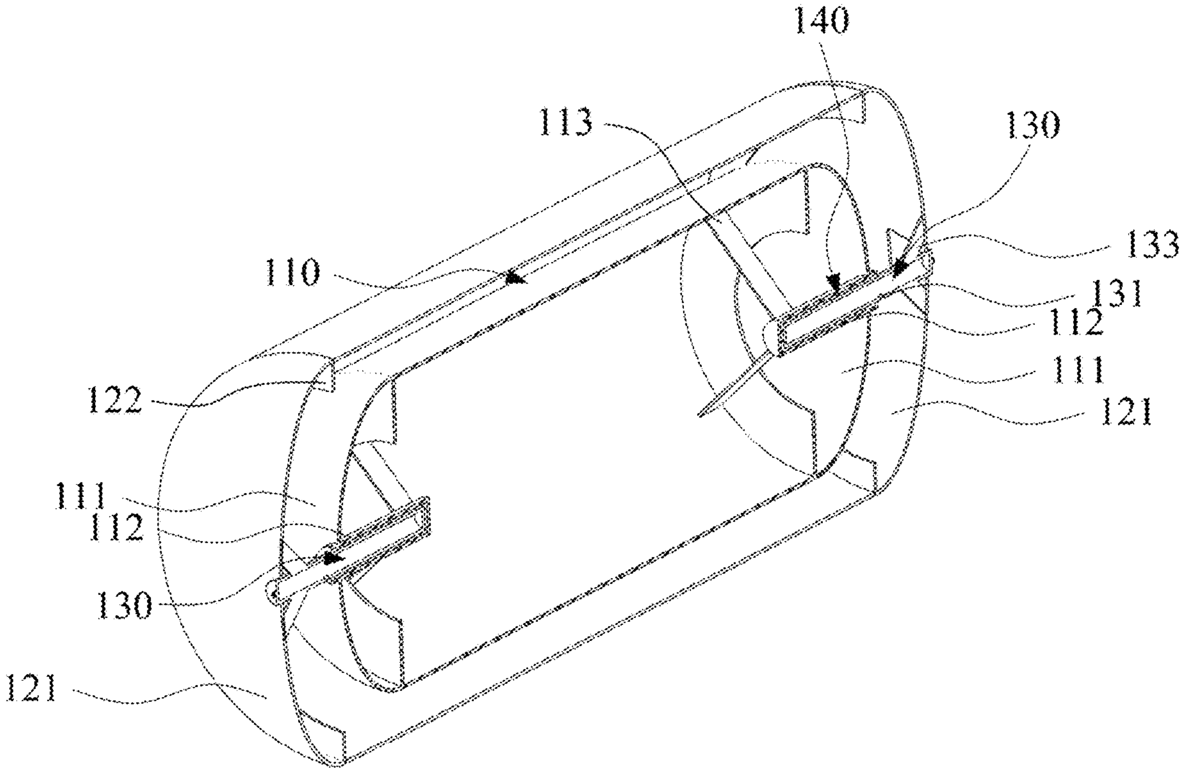
Figure 5:
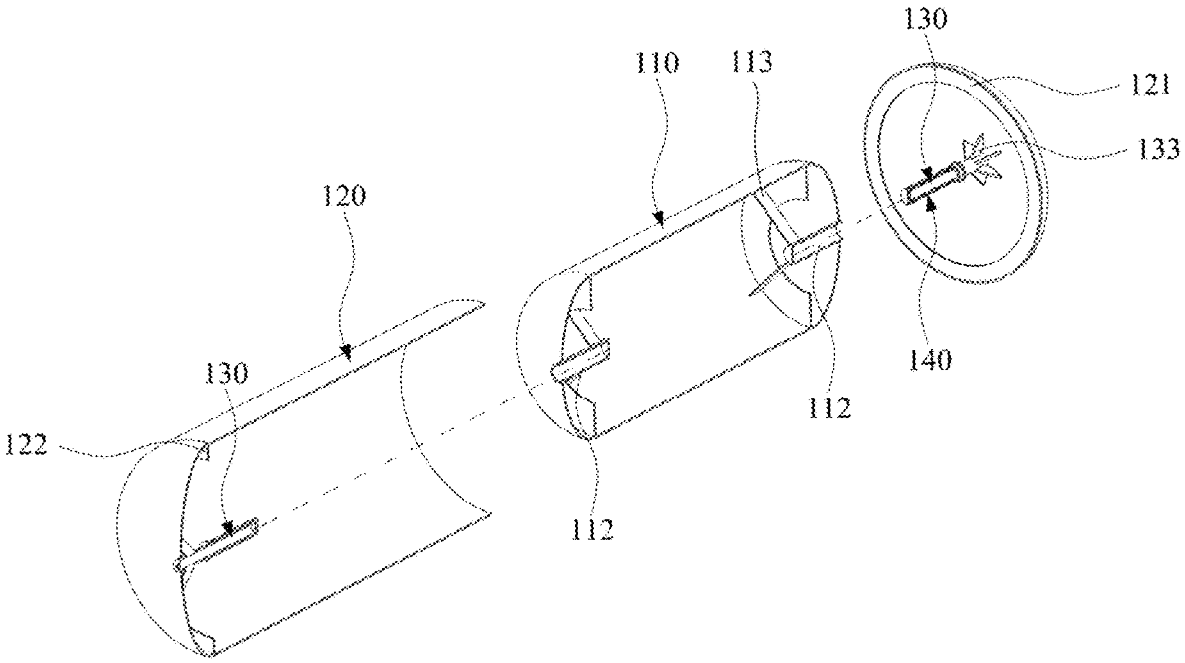

Meanwhile, as illustrated in FIGS. 3 and 5, a tripod-form or a X-letter form supporting unit 113 is combined between the outside surface of the insertion groove 112 and the inner circumferential surface of the inner tank 110 and thereby, prevents the insertion groove 112 from being deformed so that structural stability may be secured.

Figure 7A:
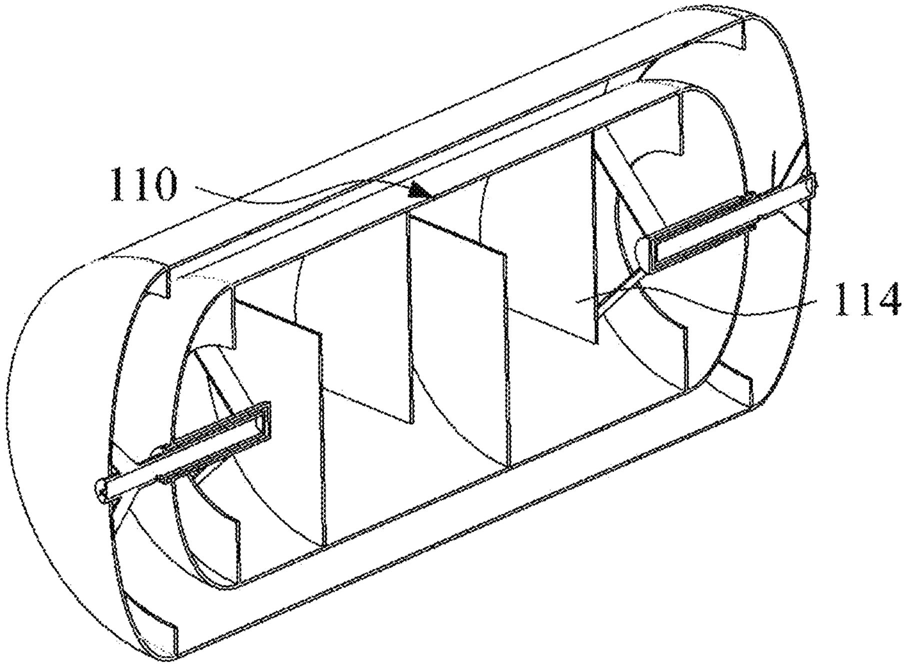
FIGS. 7A and 7B illustrate a sloshing preventive structure of the cryogenic liquid storage tank including a supporter structure of FIGS. 1A and 1B.
Figure 7B:
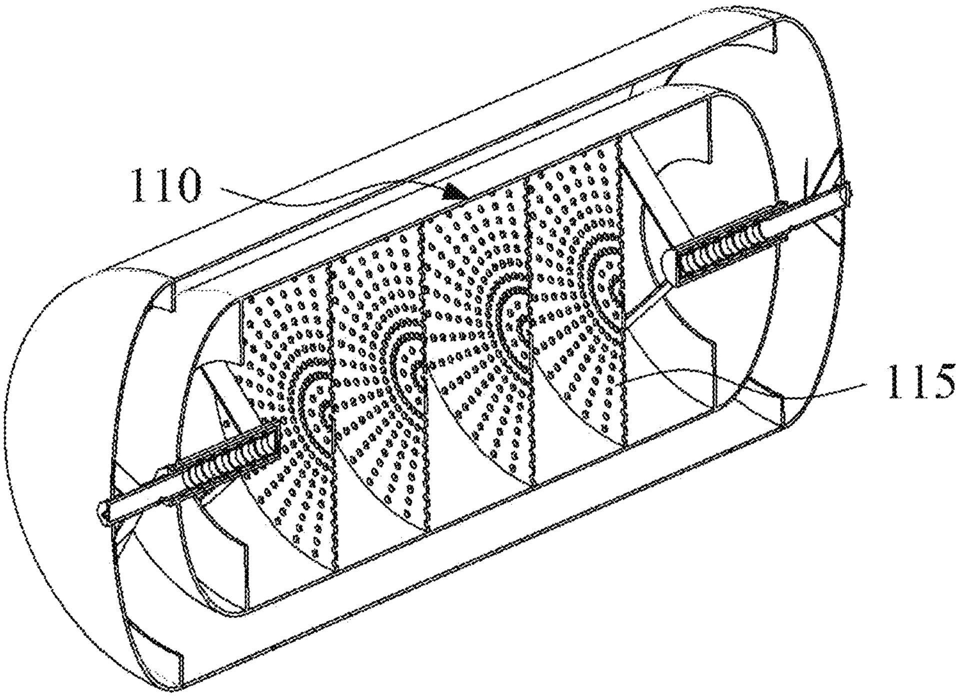

Also, as illustrated in FIGS. 7A and 7B, baffles 114 which are alternately disposed upward and downward in the inside of the inner tank 110 and one or more swash bulkheads 115 having a plurality of through holes or one or more swash bulkheads (not illustrated) having a disk structure including flow holes cut in a width direction upward and downward are disposed in a longitudinal direction of the inner tank 110. Accordingly, sloshing of transporting cryogenic liquid may be prevented and thereby, evaporation may be minimized.

Next, referring to FIGS. 1A through 4, the outer tank 120 is formed in a cylindrical form to cover the outside of the inner tank 110 and is closed with the hemispherical-form outer side plates 121 at both sides thereof so that the outer tank 120 may be formed to have an IMO Type C tank structure which is a dual structure forming a vacuum insulation space between the outer tank 120 and the inner tank 110.

Here, as illustrated in FIGS. 3 and 5, a reinforcement pin 122 which suppresses generation of buckling may be formed on the inner circumferential surface of the outer tank 120 so that the outer tank 120 may be prevented from being transformed such as a dent occurring due to a vacuum.

Next, referring to FIGS. 1A through 5, the supporter 130 may be formed to have a specific form, for example, a cylindrical form, so that the supporter 130 may be inserted and fixed to the cylindrical-form insertion groove 112 at the center of the inside of the outer side plates 121 to support the inner tank 110. However, the present invention is not limited thereto and the supporter 130 may be formed and extended to have a polyhedral form such as a hexahedron and a hexagon. Here, the insertion groove 112 may be formed to correspond to the form of the supporter 130 and thereby, restrict rotation of the inner tank 110.

In this regard, the supporter 130 may be used to maintain a vacuum between the inner tank 110 and the outer tank 120, to buffer deformation occurring due to different contraction and expansion between the inner tank 110 and the outer tank 120, to minimize heat penetration from the outside to the inner tank 110 as heat conduction is available only through the supporter 130, and thereby, to maximize a heat insulation property.

Figure 6:
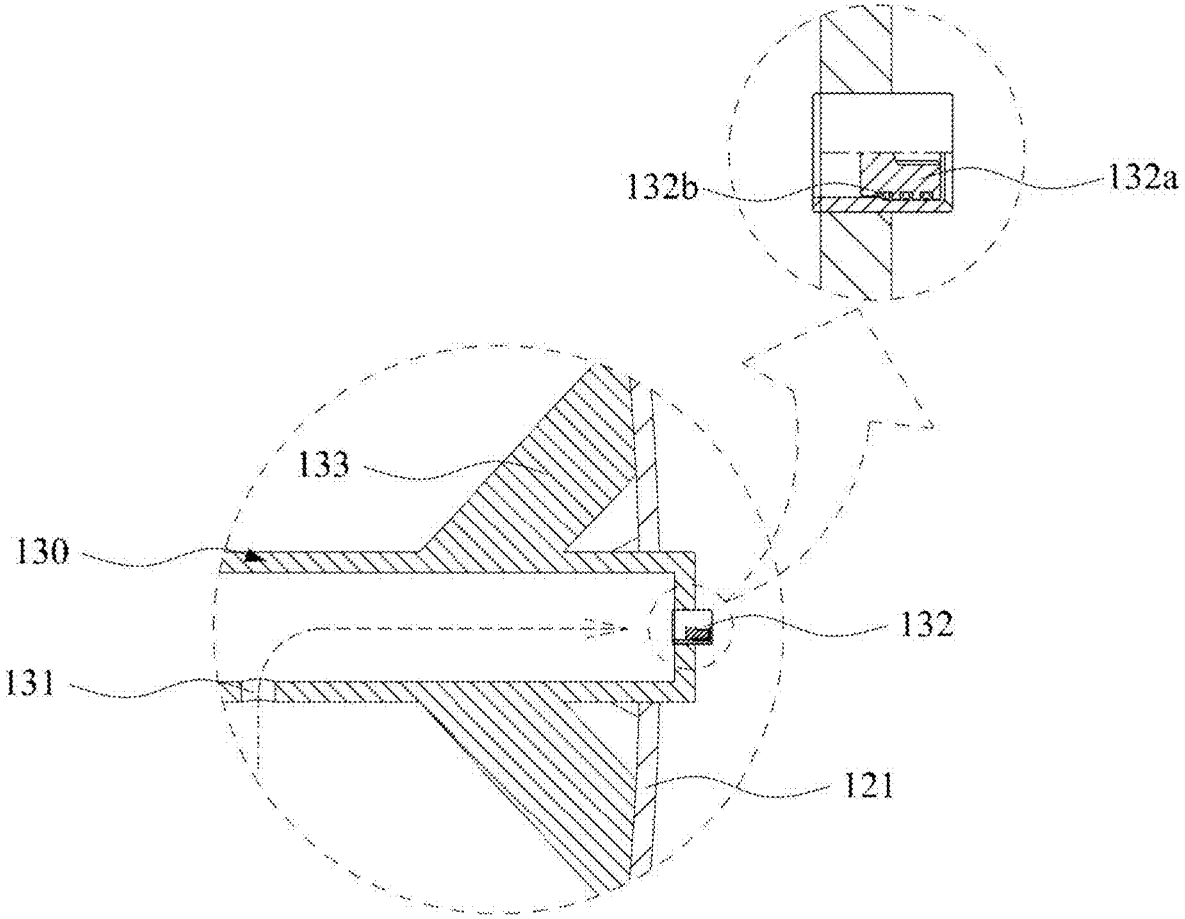
FIG. 6 is an enlarged view of a part (A) included in FIG. 2.

Meanwhile, referring to FIGS. 3 and 6, a vacuum hole 131 used to form a vacuum between the inner tank 110 and the outer tank 120 may be formed and penetrated on one side of the supporter 130 so as to be connected to a vacuum port 132.

For example, the vacuum port 132 connected to the vacuum hole 131 may be formed at the outside of the supporter 130 and a vacuum pump (not illustrated) may be connected to the vacuum port 132.

More specifically, as illustrated in an enlarged view of FIG. 6, the vacuum port 132 may include a vacuum plug 132*a*, to which a pipe of the vacuum pump is plugged, and a multi-layer O-ring 132*b* at the outside or the inside of the vacuum plug 132*a* so that the vacuum port 132 may absorbs air between the inner tank 110 and the outer tank 120 so as to form a vacuum state.

Figure 4:
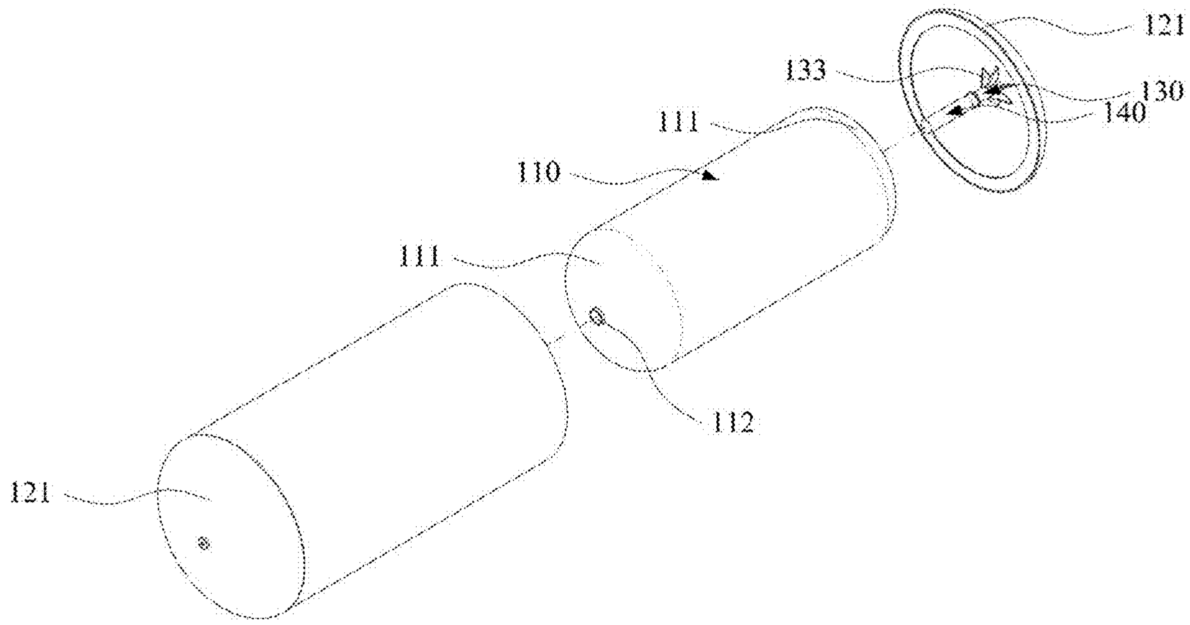
FIGS. 4 and 5 are exploded perspective views respectively illustrating the cryogenic liquid storage tank including a supporter structure of FIGS. 1A and 1B.

Also, referring to FIGS. 3 through 5, the supporter 130 may be supported by a bracket 133 formed in the inside of the outer side plates 121 of the outer tank 120 and thereby, structural stability may be secured, wherein the bracket 133 may be formed in a frame of a triangular piece, a square piece, or a polygonal form and may be spaced apart from the outside of the supporter 130 by a same angle interval.

Figure 8A:
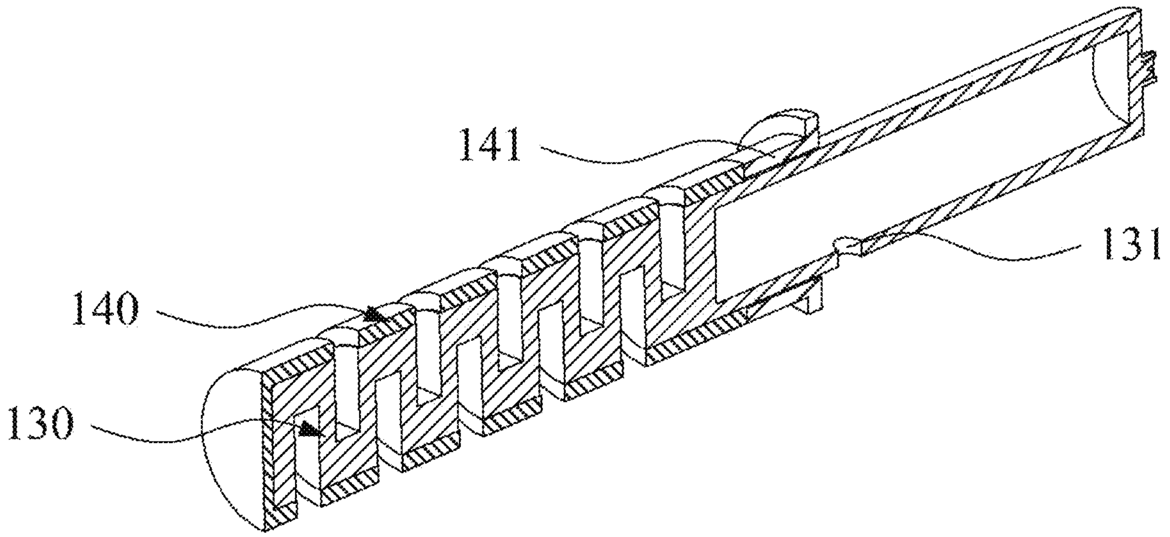
FIGS. 8A, 8B and 9 are modification examples respectively illustrating supporters of the cryogenic liquid storage tank including a supporter structure of FIGS. 1A and 1B.

In addition, referring to FIG. 8A, the supporter 130 may have a cross-section of a square waveform including trough (lower surface) and crest (upper surface) or a side-lying ㄹ-letter form and the MLI 140 may be formed to correspond to the form of the supporter 130 so as to cover the upper surface and the lower surface, that is, a contact area of the insertion groove 112 and the supporter 130. Accordingly, a contact area between the inner circumferential surface of the insertion groove 112 and the outer circumferential surface of the supporter 130 may be minimized and a heat transfer path may be relatively lengthened so that a heat insulation property may be improved.

Figure 8B:
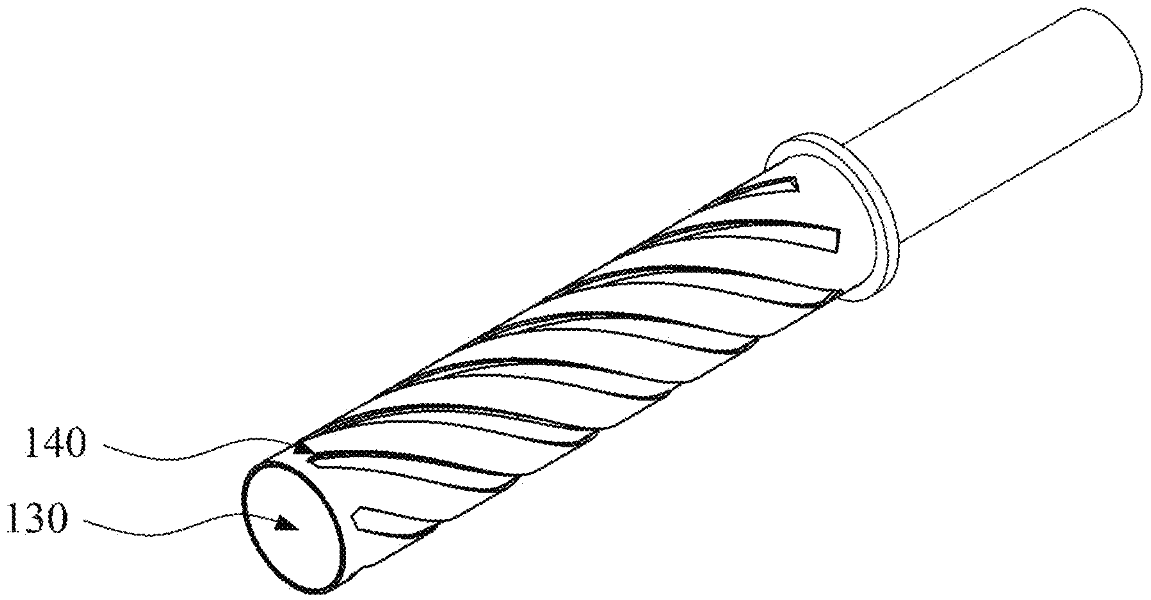

Moreover, referring to FIG. 8B, a whirlwind-form grooves are formed on the outer circumferential surface of the supporter 130 and extended in a longitudinal direction and the MLI 140 may be formed to correspond to the form of the supporter 130 so as to cover the contact area of the insertion groove 112 and the supporter 130. Accordingly, structural strength of the supporter 130 may be increased, a contact area between the inner circumferential surface of the insertion groove 112 and the outer circumferential surface of the supporter 130 may be minimized, a heat transfer path may be relatively lengthened, and thereby, a heat insulation property may be improved.

Figure 9:
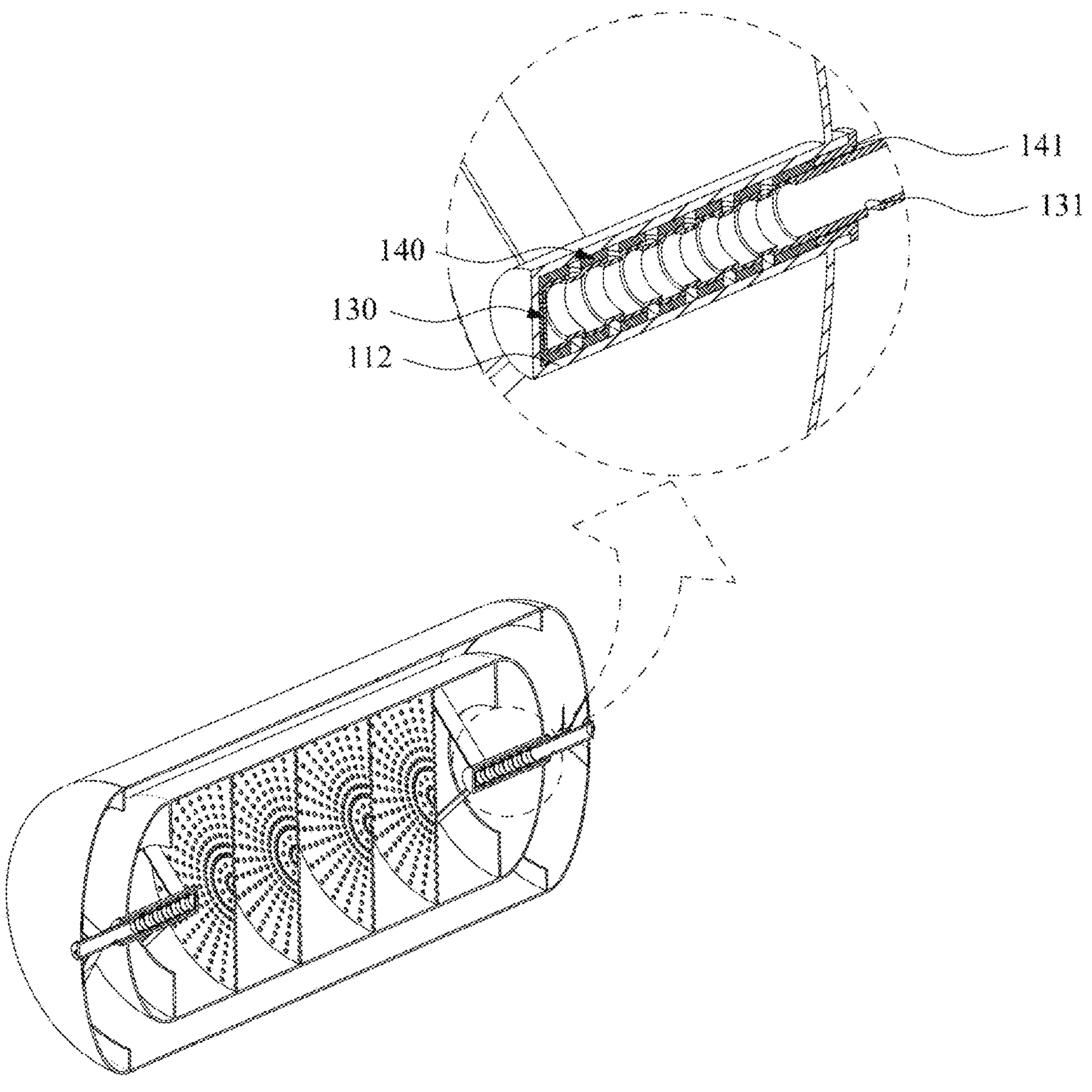

Furthermore, referring to FIG. 9, the supporter 130 may have a front end in the form of a closed pipe, wherein the cross-section of the pipe has an uneven structure, and the MLI 140 may be formed to correspond to the form of the uneven structure of the supporter 130 so as to cover convex surfaces, that is, the contact area of the insertion groove 112 and the supporter 130. Accordingly, a contact area between the inner circumferential surface of the insertion groove 112 and the outer circumferential surface of the supporter 130 may be minimized and a heat transfer path may be relatively lengthened so that a heat insulation property may be improved.

Next, referring to FIGS. 2 through 5, the MLI 140 surrounds the supporter 130 and is disposed in the contact area of the insertion groove 112 and the supporter 130, for example, the front (the cross-section of the supporter 130 contacting the inner lower surface of the insertion groove 112) and the side surface (the side of the supporter 130 contacting the inner surface of the insertion groove 112). Accordingly, thermal access (heat transfer) may be minimized and a cryogenic stage of cryogenic liquid may be maintained.

Here, the MLI 140 is disposed in a space between the insertion groove 112 and the supporter 130 and the end part of the MLI 140 may be fixed by using a flange-type bush 141.

More specifically, the MLI 140 may have a multi-layer structure in which 5 through 30 layers of aluminum thin films, alternately stacked aluminum thin films and inorganic or organic fibers, or plastic thin films having the upper parts coated with metal films are respectively twined therearound.

According to the cryogenic liquid storage tank including a supporter structure described above, a number of supporters used to support the inner tank may be minimized, the supporters may be used to stably support the inner tank so as to uniformly maintain a space between the inner tank and the outer tank and to function as a buffer, a contact area with an inner tank may be reduced to minimize thermal access and to improve a vacuum insulation performance, and heat transfer may be minimized through the MLI so as to maximize a vacuum insulation performance.

According to the present invention, a number of supporters used to support the inner tank may be minimized, the supporters may be used to stably support the inner tank so as to uniformly maintain a space between the inner tank and the outer tank and to function as a buffer, a contact area with an inner tank may be reduced to minimize thermal access and to improve a vacuum insulation performance, and heat transfer may be minimized through the MLI so as to maximize a vacuum insulation performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cryogenic liquid storage tank including a supporter structure comprising:

an inner tank for storing cryogenic liquid which comprises hemispherical-form inner side plates formed at opposite ends thereof and an insertion groove extending inside the inner tank from a center of one of the inner side plates;

an outer tank which is formed to cover an exterior of the inner tank and comprises hemispherical-form outer side plates formed at opposite ends thereof;

a supporter which is inserted into the insertion groove to support the inner tank, wherein the supporter is rigidly fixed to the outer tank; and a Multi-Layer Insulation (MLI) disposed in a contact area of the insertion groove and the supporter, wherein the supporter has a cross-section of a square waveform and the MLI is formed in a contact area of the insertion groove and the supporter in correspondence to the form of the supporter.

2. The cryogenic liquid storage tank including a supporter structure of claim 1, wherein the supporter comprises a vacuum hole penetrated at one side thereof to form a vacuum between the inner tank and the outer tank.

3. The cryogenic liquid storage tank including a supporter structure of claim 2, wherein the supporter comprises a vacuum port to be connected to the vacuum hole and a vacuum pump is connected to the vacuum port.

4. The cryogenic liquid storage tank including a supporter structure of claim 1, wherein the supporter is supported by a bracket formed inside of the outer tank.

5. The cryogenic liquid storage tank including a supporter structure of claim 1, wherein the outer tank comprises a reinforcement pin at an inner circumferential surface of the outer tank to suppress generation of buckling.

6. The cryogenic liquid storage tank including a supporter structure of claim 1, wherein a supporting unit is combined between an outer surface of the insertion groove and an inner circumferential surface of the inner tank.

7. The cryogenic liquid storage tank including a supporter structure of claim 1, wherein an end part of the MLI is fixed by using a flange-type bush.

8. A cryogenic liquid storage tank including a supporter structure comprising:

an inner tank for storing cryogenic liquid which comprises hemispherical-form inner side plates formed at opposite ends thereof and an insertion groove extending inside the inner tank from a center of one of the inner side plates;

an outer tank which is formed to cover an exterior of the inner tank and comprises hemispherical-form outer side plates formed at opposite ends thereof;

a supporter which is inserted into the insertion groove to support the inner tank, wherein the supporter is rigidly fixed to the outer tank; and a Multi-Layer Insulation (MLI) disposed in a contact area of the insertion groove and the supporter, wherein the supporter comprises spiral shaped grooves extended in a longitudinal direction on the outer circumferential surface thereof and the MLI is formed in a contact area of the insertion groove and the supporter in correspondence to the form of the supporter.

9. The cryogenic liquid storage tank including a supporter structure of claim 8, wherein the supporter comprises a vacuum hole penetrated at one side thereof to form a vacuum between the inner tank and the outer tank.

10. The cryogenic liquid storage tank including a supporter structure of claim 9, wherein the supporter comprises a vacuum port to be connected to the vacuum hole and a vacuum pump is connected to the vacuum port.

11. The cryogenic liquid storage tank including a supporter structure of claim 8, wherein the supporter is supported by a bracket formed inside of the outer tank.

12. The cryogenic liquid storage tank including a supporter structure of claim 8, wherein the outer tank comprises a reinforcement pin at an inner circumferential surface of the outer tank to suppress generation of buckling.

13. The cryogenic liquid storage tank including a supporter structure of claim 8, wherein a supporting unit is combined between an outer surface of the insertion groove and an inner circumferential surface of the inner tank.

14. The cryogenic liquid storage tank including a supporter structure of claim 8, wherein an end part of the MLI is fixed by using a flange-type bush.

* * * * *